United States Patent
Nakagawa

(10) Patent No.: US 9,205,762 B2
(45) Date of Patent: Dec. 8, 2015

(54) OCCUPANT DETECTION APPARATUS, OCCUPANT DETECTION METHOD AND VEHICLE

(75) Inventor: Hajime Nakagawa, Nagoya (JP)

(73) Assignee: DENSO CORPORATION, Kariya, Aichi-pref (JP)

( * ) Notice: Subject to any disclaimer, the term of this patent is extended or adjusted under 35 U.S.C. 154(b) by 1023 days.

(21) Appl. No.: 13/329,663

(22) Filed: Dec. 19, 2011

(65) Prior Publication Data
US 2012/0161777 A1    Jun. 28, 2012

(30) Foreign Application Priority Data

Dec. 22, 2010 (JP) .................................. 2010-286310

(51) Int. Cl.
*G01R 29/12* (2006.01)
*B60N 2/00* (2006.01)
*B60R 21/015* (2006.01)

(52) U.S. Cl.
CPC ............ *B60N 2/002* (2013.01); *B60R 21/0154* (2014.10); *B60R 21/01532* (2014.10)

(58) Field of Classification Search
CPC ................... B60R 21/01532; B60R 21/01556; B60R 21/0154; B60N 2/002
See application file for complete search history.

(56) References Cited

U.S. PATENT DOCUMENTS

| | | | |
|---|---|---|---|
| 6,517,106 B1 * | 2/2003 | Stanley et al. ................. | 280/735 |
| 7,796,017 B2 | 9/2010 | Kiribayashi | |
| 2005/0275202 A1 * | 12/2005 | Wato et al. ..................... | 280/735 |
| 2007/0188553 A1 * | 8/2007 | Hiruma ........................... | 347/47 |
| 2008/0018143 A1 * | 1/2008 | Ito et al. ..................... | 297/180.12 |
| 2008/0100425 A1 * | 5/2008 | Kiribayashi ................ | 340/425.5 |
| 2008/0186192 A1 * | 8/2008 | Yamanaka et al. ............. | 340/667 |
| 2010/0073181 A1 | 3/2010 | Ootaka et al. | |
| 2010/0152975 A1 * | 6/2010 | Nakagawa et al. .............. | 701/45 |
| 2010/0315234 A1 * | 12/2010 | Ootaka .......................... | 340/561 |
| 2011/0098891 A1 * | 4/2011 | Inayoshi et al. ................. | 701/45 |
| 2011/0289126 A1 * | 11/2011 | Aikas et al. .................... | 707/827 |

FOREIGN PATENT DOCUMENTS

JP     2009-269999     11/2009

* cited by examiner

*Primary Examiner* — Tung X Nguyen
*Assistant Examiner* — Adam Clarke
(74) *Attorney, Agent, or Firm* — Harness, Dickey & Pierce, P.L.C.

(57) ABSTRACT

An occupant detection apparatus includes an electrostatic capacitance type sensor having a main electrode, a sub electrode and a guard electrode, an impedance measurement device that outputs an alternating current signal to measure an impedance, and an occupant discrimination device that discriminates an occupant. The guard electrode is provided oppositely to main electrode and not oppositely to the sub electrode. The impedance measurement device outputs an alternating current signal to pass the signal through the main electrode so as to measure a main impedance. Further, the impedance measurement device outputs the alternating current signal to pass the signal through sub electrode so as to measure a sub impedance. The occupant discrimination device discriminates the occupant based on an electrostatic capacitance component of the main impedance and a resistance value component of the sub impedance.

17 Claims, 11 Drawing Sheets

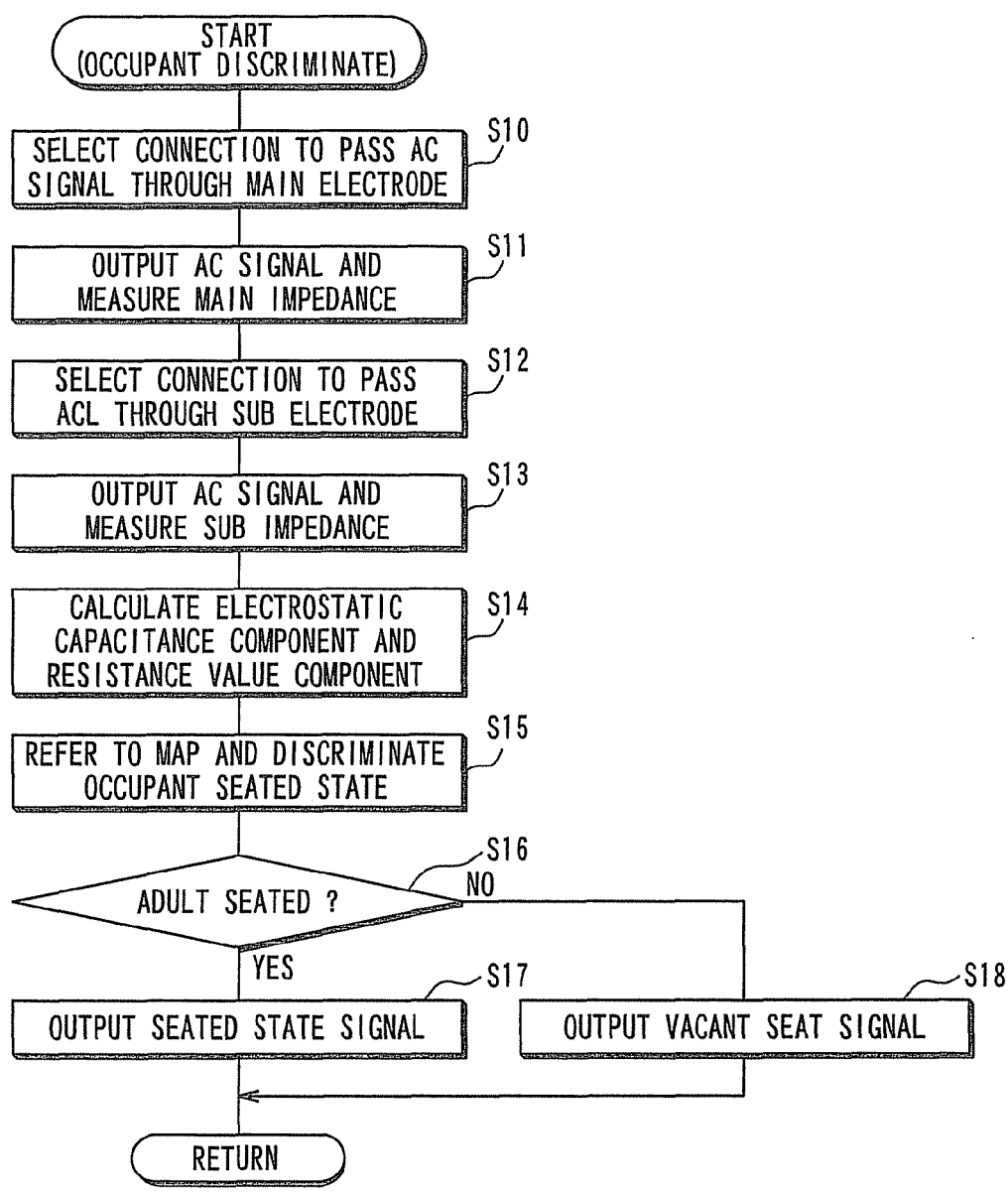

FIG. 6

| | ELECTROSTATIC CAPACITANCE COMPONENT | RESISTANCE VALUE COMPONENT | CONNECTION SELECTION (FIG. 3) |
|---|---|---|---|
| J0 | Cmg | Rmg | (A) |
| J1 | Cmg | Rsg | (A), (B) |
| J2 | Cmg | Rmg+Rsg | (A), (B) |
| J3 | Cmg | Rms | (A), (C) |
| J4 | Cmg+Csg | Rmg | (A), (B) |
| J5 | Cmg+Csg | Rsg | (A), (B) |
| J6 | Cmg+Csg | Rmg+Rsg | (A), (B) |
| J7 | Cmg+Csg | Rms | (A), (B), (C) |
| J8 | Cms | Rmg | (A), (C) |
| J9 | Cms | Rsg | (B), (C) |
| J10 | Cms | Rmg+Rsg | (A), (B), (C) |
| J11 | Cms | Rms | (C) |

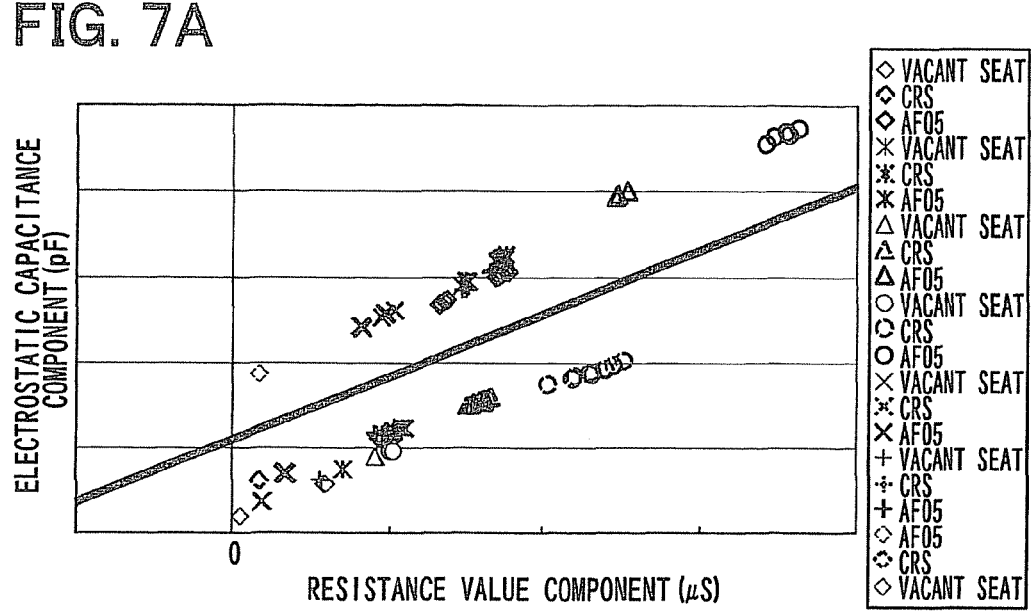

OCCUPANT DETECTION APPARATUS, OCCUPANT DETECTION METHOD AND VEHICLE

CROSS REFERENCE TO RELATED APPLICATION

The present application is based on and incorporates herein by reference Japanese Patent Application No. 2010-286310 filed on Dec. 22, 2010.

FIELD OF THE INVENTION

The present invention relates to an occupant detection apparatus having an electrostatic capacitance type sensor and an impedance measurement device, an occupant detection method using the occupant detection apparatus, and a vehicle having the occupant detection apparatus.

BACKGROUND OF THE INVENTION

[Patent document 1] JP 2010-096743 A (US 2010/0073181 A1)

[Patent document 2] JP 2008-111809 A (U.S. Pat. No. 7,796,017 B2)

Conventionally, an example of an electrostatic type occupant detector, having a sub electrode in addition to a main electrode for the purpose of improvement in a signal to noise ratio (SN ratio) by increasing an electrode area, has been disclosed (e.g., see Patent document 1).

Further, an example of an electrostatic capacity occupant detection sensor to calculate an impedance between a main electrode and a sub electrode and perform discrimination based on an imaginary number part of the impedance between the main and sub electrodes, for the purpose of improvement in seat wet discrimination accuracy, has been disclosed (e.g., see Patent document 2).

However, in a seat, in addition to a seating face portion including a surface on which an occupant is seated, a non-seating face portion may also be wet or in a high humidity state. Note that the "non-seating face portion" means a part other than the seating face portion. More particularly, a part inside the seat, a lower part of the seat or the like correspond to the non-seating face portion. For example, "getting wet" is a state where water beyond an absorptive amount is spilt from the seating face portion. The seat may be in the high humidity state when an occupant is seated for a long time. Otherwise, the seat may be in the high humidity state in a rainy season or upon rise of fog.

When the technique disclosed in the above-described Patent document 1 is applied, it is merely detection of an electrostatic capacitance which occurs between (i) the main electrode and the sub electrode and (ii) the occupant (human body). Accordingly, in some cases, it is not possible to accurately perform occupant discrimination due to the influence of water which exists inside or in the lower part of the seat.

Further, when the technique disclosed in the above-described Patent document 2 is applied, it is merely detected whether or not both the main electrode and the sub electrode are wet in a selected predetermined mode (wet state detection mode). Accordingly, it is impossible still in the wet state detection mode to discriminate whether or not the seat is in a vacant seat state, an adult seated state (e.g. "AF05" indicating weight regular distribution) or a CRS (Child Restraint System) attached state. Accordingly, upon discrimination of occupant presence/absence, it is necessary to select another mode (occupant detection mode), i.e., to select another connection, to perform the discrimination.

SUMMARY OF THE INVENTION

It is an object of the present invention to provide an occupant detection apparatus, an occupant detection method and a vehicle capable of improving the accuracy of occupant discrimination even when the non-seating face portion of a seat in addition to a seating face portion is in the wet state or high humidity state. According to an example of the present invention, provided is an occupant detection apparatus including: an electrostatic capacitance type sensor having a main electrode provided in a seating face portion of a seat, a sub electrode provided away from the main electrode in a planar direction, and a guard electrode provided between the seating face portion and a seat frame; and an impedance measurement device that outputs an alternating current signal to the electrostatic capacitance type sensor so as to measure an impedance of the electrostatic capacitance type sensor. The guard electrode is provided between the main electrode and the seat frame, oppositely to the main electrode and not oppositely to the sub electrode, and the impedance measurement device outputs the alternating current signal to pass the alternating current signal through the main electrode so as to measure a main impedance, and outputs the alternating current signal to pass the alternating current signal through the sub electrode so as to measure a sub impedance. Further, the apparatus further includes an occupant discrimination device that discriminates an occupant based on an electrostatic capacitance component of the main impedance and a resistance value component of the sub impedance measured by the impedance measurement device.

According to the above structure, the occupant discrimination device discriminates the occupant (i.e., a vacant seat state, an adult seated state or a CRS attached state) based on the electrostatic capacitance component of the main impedance and the resistance value component (admittance component) of the sub impedance. As the main impedance can be obtained by passing the alternating current signal through the main electrode, the wet state and the high humidity state mainly in the seating face portion can be detected. As the sub impedance can be obtained by passing the alternating current signal through the sub electrode, the wet state and the high humidity state mainly in the non-seating face portion can be detected. Even in the wet or high humidity state in the non-seating face portion in addition to the seating face portion of the seat, it is possible to improve the accuracy of occupant discrimination by combining the electrostatic capacitance component of the main impedance and the resistance value component of the sub impedance.

Note that the "main electrode" and the "sub electrode" are used for distinction between the electrodes. Similarly the "main impedance" and the "sub impedance" are used for distinction of impedance between two points (including electrodes and terminals). The "electrostatic capacitance component" corresponds to an imaginary number component of the impedance. The "resistance value component" corresponds to a real number component of the impedance. The "alternating current signal" may be represented as a waveform, an amplitude, a frequency or the like as long as it can be used for measurement of impedance. The "seat frame" is a framework of the seat. The seat frame is formed with a conductive member (e.g., a metal member), thereby being used as a ground indicating electrical isopotential (GND; note that it is not limited to 0[V]).

According to another example of the present invention, provided is an occupant discrimination method for discriminating an occupant using an occupant detection apparatus. The occupant detection apparatus includes: an electrostatic capacitance type sensor having a main electrode provided in a seating face portion of a seat, a sub electrode provided away from the main electrode in a planar direction, and a guard electrode provided between the seating face portion and a seat frame; and an impedance measurement device that outputs an alternating current signal to the electrostatic capacitance type sensor to measure an impedance of the electrostatic capacitance type sensor. In the occupant discrimination method, the guard electrode is provided between the main electrode and the seat frame oppositely to the main electrode and not oppositely to the sub electrode. The method includes: an impedance measurement step of outputting the alternating current signal to pass the alternating current signal through the main electrode so as to measure a main impedance, and outputting the alternating current signal to pass the alternating current signal through the sub electrode so as to measure a sub impedance, by the impedance measurement device; and an occupant discrimination step of discriminating an occupant based on an electrostatic capacitance component of the main impedance and a resistance value component of the sub impedance measured by the impedance measurement device. According to the above structure, at the occupant discrimination step, the occupant (i.e., the vacant seat state, the adult seated state or the CRS attached state) is discriminated based on the electrostatic capacitance component of the main impedance and the resistance value component of the sub impedance. Accordingly, as in the case of the above occupant detection apparatus, the accuracy of occupant discrimination can be improved even when the non-seating face portion of the seat in addition to the seating face portion is in the wet state or the high humidity state.

According to yet another example of the present invention, provided is a vehicle having the above-mentioned occupant detection apparatus and the seat.

According to the above structure, it is possible to provide a vehicle in which the accuracy of occupant discrimination can be improved even when the non-seating face portion of the seat in addition to the seating face portion is in the wet state or the high humidity state.

According to yet another example of the present invention, an occupant detection apparatus is provided as follows. An electrostatic capacitance type sensor is included to contain (i) a main electrode provided in a seating face portion of a seat, (ii) a sub electrode provided away from the main electrode in a planar direction, and (iii) a guard electrode provided between the seating face portion and a seat frame, wherein the guard electrode is provided between the main electrode and the seat frame, oppositely to the main electrode and not oppositely to the sub electrode. An impedance measurement device is included to output an alternating current signal to the electrostatic capacitance type sensor so as to measure an impedance of the electrostatic capacitance type sensor. The impedance measurement device outputs the alternating current signal to pass the alternating current signal through the main electrode so as to measure a main impedance. The impedance measurement device outputs the alternating current signal to pass the alternating current signal through the sub electrode so as to measure a sub impedance. An occupant discrimination device is included to discriminate an occupant based on an electrostatic capacitance component of the main impedance and/or the sub impedance and a resistance value component of the main impedance and/or the sub impedance.

According to yet another example of the present invention, an occupant detection apparatus is provided as follows. An electrostatic capacitance type sensor is included to contain (i) main electrode provided in a seating face portion of a seat, (ii) a sub electrode provided away from the main electrode in a planar direction, and (iii) a guard electrode provided between the seating face portion and a seat frame, wherein the guard electrode is provided between the main electrode and the seat frame, oppositely to the main electrode and not oppositely to the sub electrode. An impedance measurement device is included to output an alternating current signal to the electrostatic capacitance type sensor so as to measure an impedance of the electrostatic capacitance type sensor. The impedance measurement device outputs the alternating current signal to passes the alternating current signal between at least the main electrode and the sub electrode so as to measure the sub impedance. An occupant discrimination device is included to discriminate an occupant based on an electrostatic capacitance component of the sub impedance and a resistance value component of the sub impedance.

According to yet another example of the present invention, an occupant detection apparatus is provided as follows. An electrostatic capacitance type sensor is included to contain (i) a main electrode provided in a seating face portion of a seat, and (ii) a guard electrode provided between the seating face portion and a seat frame, wherein the guard electrode is provided between the main electrode and the seat frame, oppositely to the main electrode. An impedance measurement device is included to output an alternating current signal to the electrostatic capacitance type sensor so as to measure an impedance of the electrostatic capacitance type sensor. The impedance measurement device outputs the alternating current signal to pass the alternating current signal through the main electrode so as to measure a main impedance. An occupant discrimination device is included to discriminate an occupant based on an electrostatic capacitance component of the main impedance and a resistance value component of the main impedance.

BRIEF DESCRIPTION OF THE DRAWINGS

The above and other objects, features, and advantages of the present invention will become more apparent from the following detailed description made with reference to the accompanying drawings. In the drawings:

FIG. 5 is a flowchart showing an example of the procedure of occupant discrimination processing;

FIG. 6 is a table showing examples of connection selection to obtain electrostatic capacitance component and resistance value component;

FIGS. 7A and 7B are graphs showing characteristics in a first connection example;

DETAILED DESCRIPTION OF THE PREFERRED EMBODIMENTS

Hereinbelow, embodiments of the present invention will be described based on the drawings. Note that "to connect" means electrical connection as long as it does not mean any particular expression. The respective figures show elements necessary for explanation of the embodiments of the present invention, but do not show all the actual elements. The indication of upward/downward/leftward/rightward direction is made based on descriptions on the drawings.

Figure 1:
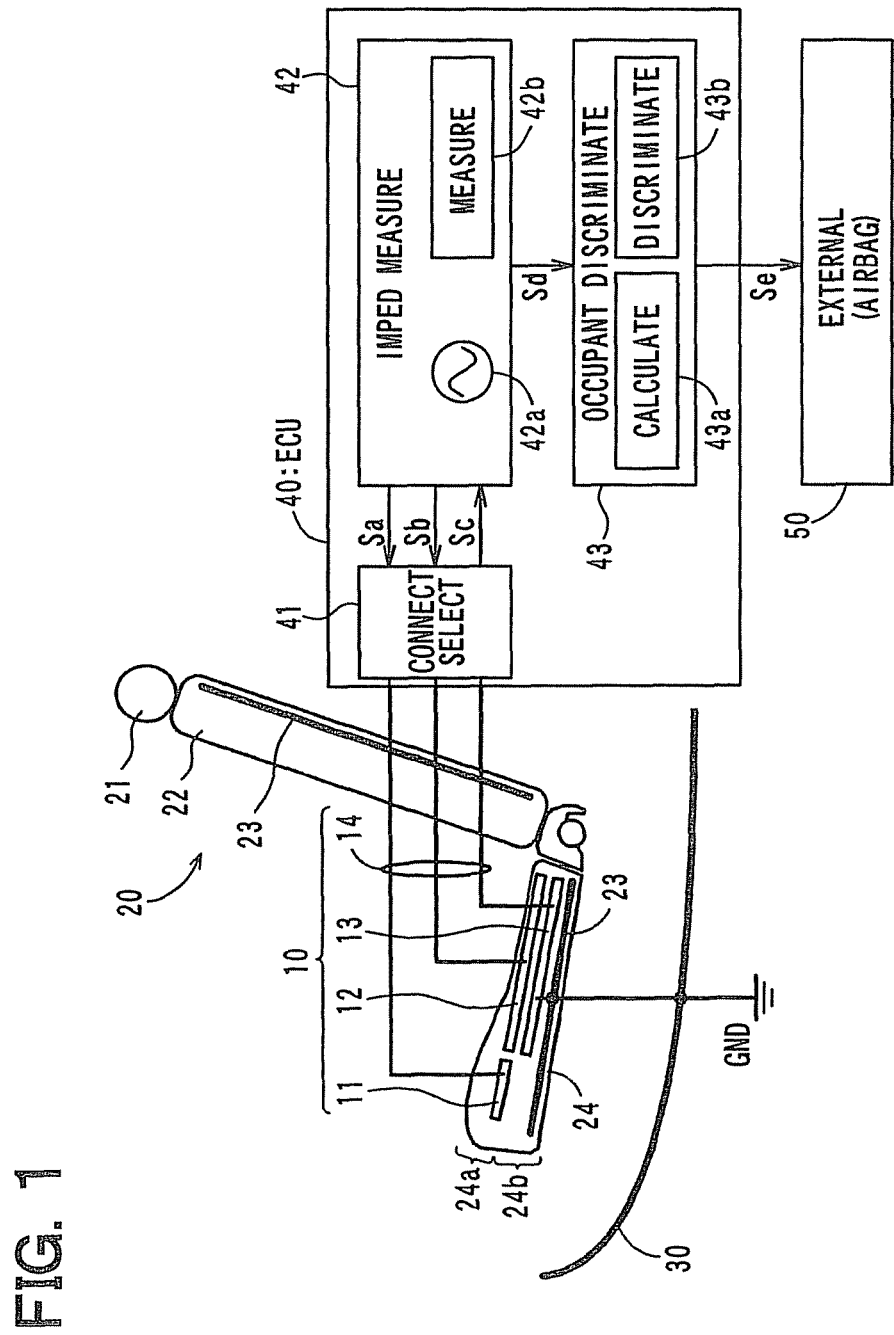
FIG. 1 schematically illustrates an example of the configuration of an occupant detection apparatus.

First, FIG. 1 schematically illustrates an example of the configuration of an occupant detection apparatus. The occupant detection apparatus shown in FIG. 1 mainly has an electrostatic capacitance type sensor 10 and an ECU 40. The electrostatic capacitance type sensor 10 and the ECU 40 are connected with a signal line 14, a connector 15 or the like (see FIG. 2A). A seat 20 has a head rest 21, cushion pads 22 and 24 and the like. The cushion pad 24 mainly holds an occupant's buttocks, femoral region and the like. The cushion pad 24 has a seating face portion 24a including a surface on which the occupant is seated, and a non-seating face portion 24b as a part other than the seating face portion 24a. The cushion pad 22 mainly holds the occupant's back and the like. The cushion pads 22 and 24 include a seat frame 23 used as a ground indicating electrical isopotential (GND; note that it is not limited to 0[V]). The seat frame 23 is connected to a guard electrode 13 and a vehicle body 30.

The electrostatic capacitance type sensor 10 is provided in the seating face portion 24a in the cushion pad 24. The electrostatic capacitance type sensor 10 has at least a sub electrode 11, a main electrode 12 and the guard electrode 13. It may be arranged such that the electrostatic capacitance type sensor 10 further has the signal line 14 and the connector 15 in accordance with necessity (see FIG. 2A). The main electrode 12 is provided in the seating face portion 24a of the seat 20. The sub electrode 11 is provided away from the main electrode 12 in a planar direction. The guard electrode 13 is provided between the main electrode 12 and the seat frame 23 oppositely to the main electrode 12, but not oppositely to the sub electrode 11. The guard electrode 13 prevents entrance of noise into the main electrode 12 from an opposite side to the seating surface (the lower side in the figure).

The areal relation between the sub electrode 11 and the main electrode 12 is arbitrarily set. Generally, as the relation, sub electrode<main electrode holds. However, it may be arranged such that sub electrode=main electrode holds, otherwise, sub electrode>main electrode holds. As the area is increased, the sensitivity to water (humidity) is increased. The configuration of the electrostatic capacitance type sensor 10 will be described later (see FIG. 2).

The ECU 40 as an example of the processing unit has a connection selection device or means 41, an impedance measurement device or means 42, an occupant discrimination device or means 43, and the like. The connection selection device 41 has a function of selecting a connection based on a selection signal Sa transmitted from the impedance measurement device 42 to be described later. The selection signal Sa is transmitted upon measurement of main impedance or sub impedance or the both impedances. An example of selection by the connection selection device 41 will be described later (see FIGS. 3A to 3C).

The impedance measurement device 42 has a function of outputting an alternating current signal Sb to the electrostatic capacitance type sensor 10 to measure the impedance of the electrostatic capacitance type sensor 10. The impedance measurement device 42 has a signal source 42a, a measuring unit 42b and the like. The signal source 42a has a function of generating and outputting the alternating current signal Sb. The alternating current signal Sb may be represented as a waveform, an amplitude, a frequency or the like as long as it can be used for measurement of impedance.

The measuring unit 42b has a function of passing the alternating current signal Sb through a connection between two points selected by the connection selection device 41 to measure the impedance. As a particular impedance measurement method is known, illustration and explanation of the method will be omitted. The main impedance is measured by passing the alternating current signal Sb through the connection including the main electrode 12 at least as one point. The sub impedance is measured by passing the alternating current signal Sb through the connection including the sub electrode 11 at least as one point. In the present embodiment, an inter-electrode impedance measured by passing the alternating current signal Sb through the both sub electrode 11 and main electrode 12 is included in the sub impedance.

Figure 2A:
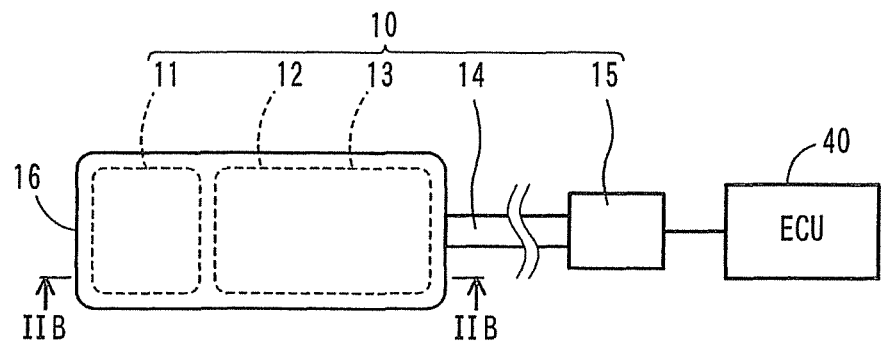
FIGS. 2A and 2B schematically illustrate an example of the configuration of an electrostatic capacitance type sensor.
Figure 2B:
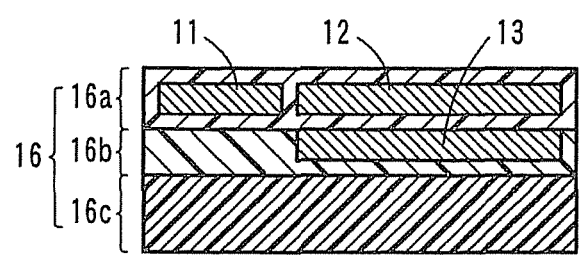

The occupant discrimination device 43 has a function of discriminating an occupant (i.e., a vacant seat state, an adult seated state or a CRS attached state), i.e., discriminating a type of an object that is seated on the seat 20. The occupant discrimination device 43 outputs a discrimination result signal Se (e.g., a seated state signal or a vacant seat signal) to an external apparatus 50 in accordance with necessity. The occupant discrimination device 43 has a calculation unit 43a and a discrimination unit 43b. The calculation unit 43a calculates, based on an impedance included in a measurement signal Sd transmitted from the impedance measurement device 42, an electrostatic capacitance component and a resistance value component of the impedance. The discrimination unit 43b discriminates the occupant based on the electrostatic capacitance component of the main impedance and the resistance value component of the sub impedance. The external apparatus 50 is, e.g., an airbag system (especially an airbag ECU) to expand an airbag upon emergency. FIGS. 2A and 2B schematically illustrate an example of the configuration of the electrostatic capacitance type sensor 10. FIG. 2A is a plan view, and FIG. 2B, a cross-sectional view along an arrow line IIB-IIB in FIG. 2A. As shown in FIG. 2A, the electrodes (i.e., the sub electrode 11, the main electrode 12 and the guard electrode 13) of the electrostatic capacitance type sensor 10 are accommodated in a sensor mat 16. As shown in FIG. 2B, the sensor mat 16 has a film 16a, an insulating coat 16b, a mat 16c and the like. In FIG. 2B, the sub electrode 11 and the main electrode 12 are accommodated in the film 16a, and the guard electrode 13 is accommodated in the insulating coat 16b. Note that the arrangement of the sub electrode 11, the main electrode 12 and the guard electrode 13 is the same as that in FIG. 1. The mat 16c is formed by using elastic resin such as urethane.

Figure 3A:
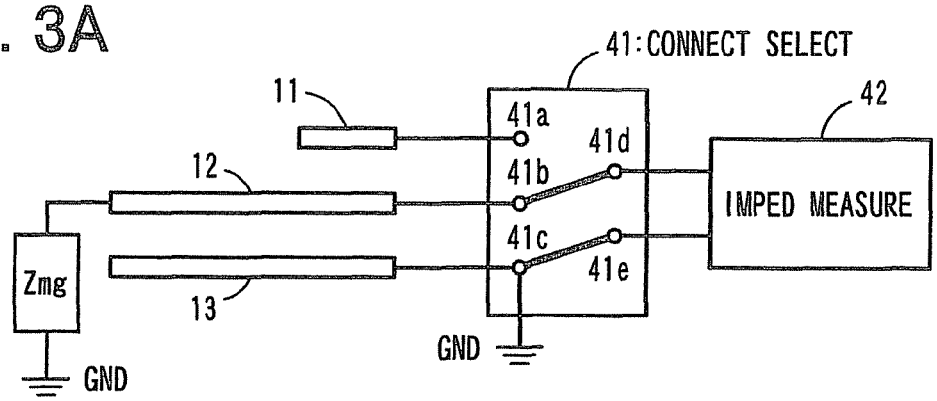
FIGS. 3A to 3C schematically illustrate examples of connection selection by a connection selection device.
Figure 3B:
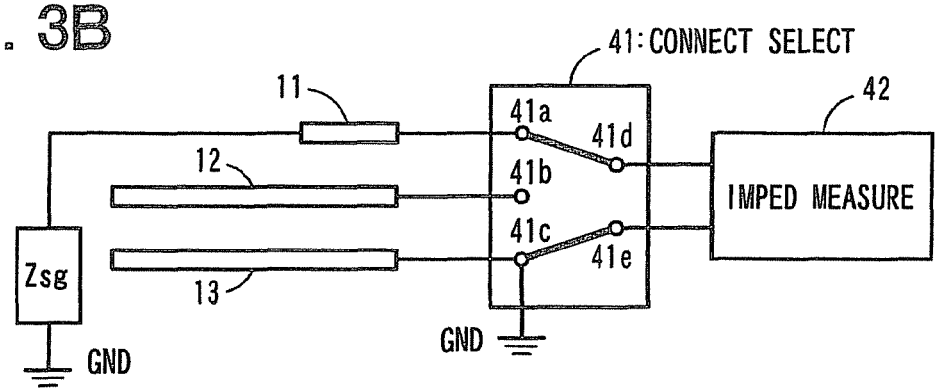
Figure 3C:
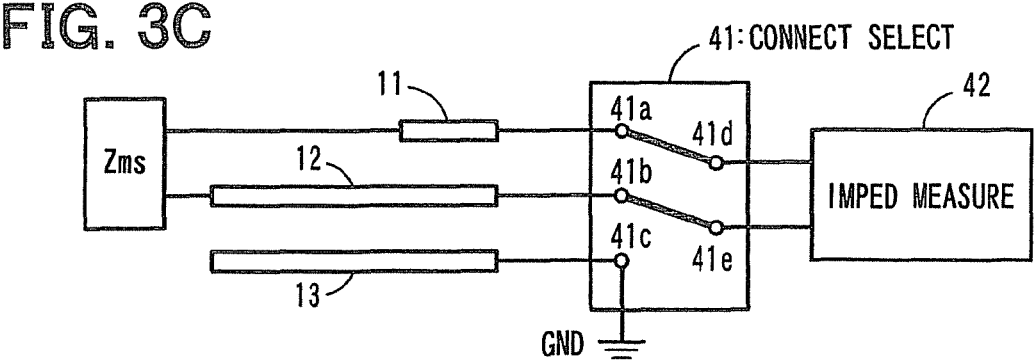

FIGS. 3A to 3C illustrate examples of connection selection by the connection selection device 41. As the connection selection device 41 shown in FIGS. 3A to 3C, a contact switch is used for the sake of assistance of understanding. The connection selection device 41 has terminals 41a to 41e. Further, an electromagnetic switch (including a relay), a semiconductor switch (including a semiconductor relay) or the like may be used. The terminal 41a is connected to the sub electrode 11; the terminal 41b, connected to the main electrode 12; and the terminal 41c, connected to the guard electrode 13 (or the seat frame 23 or the vehicle body 30). The terminals 41d and 41e are connected to the impedance measurement device 42.

The connection selection device 41 has a function of selecting a connection between arbitrarily selected two points. For example, the connection between the sub electrode 11 and the seat frame 23, the connection between the main electrode 12 and the sub electrode 11, or the connection between the sub electrode 11 and the main electrode 12, is selected. The selection is made, e.g., between (i) the main electrode 12 and the seat frame 23 and (ii) the sub electrode 11 and the seat frame 23, or between (i) the main electrode 12 and the seat frame 23 and (ii) the main electrode 12 and the sub electrode 11, or between (i) the sub electrode 11 and the seat frame 23 and (ii) the main electrode 12 and the sub electrode 11.

FIGS. 3A to 3C show examples of selection after the connection selection by the connection selection device 41. In the connection example shown in FIG. 3A, the terminal 41b and the terminal 41d are connected, and the terminal 41c and the terminal 41e are connected. Upon measurement of a main impedance Zmg, the main electrode 12 and the seat frame 23 are connected. In the connection example shown in FIG. 3B, the terminal 41a and the terminal 41d are connected, and the terminal 41c and the terminal 41e are connected. Upon measurement of a sub impedance Zsg, the sub electrode 11 and the seat frame 23 are connected. In the connection example shown in FIG. 3C, the terminal 41a and the terminal 41d are connected, and the terminal 41b and the terminal 41e are connected. Upon measurement of an inter-electrode impedance Zms (sub impedance Zsg), the main electrode 12 and the sub electrode 11 are connected.

Figure 4A:
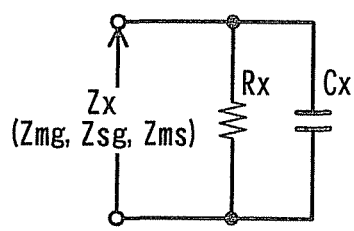
FIGS. 4A and 4B illustrate relation between impedance and components.
Figure 4B:
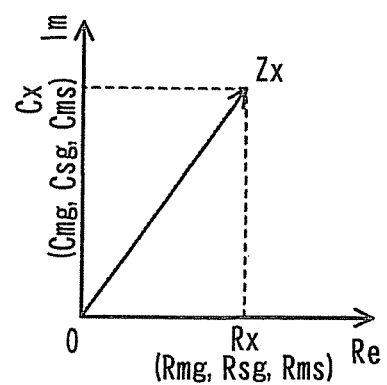

FIGS. 4A and 4B show the relation between the impedance and the components. FIG. 4A shows an equivalent circuit, and FIG. 4B, a graph showing the relation between an imaginary number component and a real number component. As shown in FIG. 4A, an impedance Zx measured by the connection selection device 41 is represented with an equivalent circuit in which the electrostatic capacitance component Cx and the resistance value component Rx are parallel-connected. As shown in FIG. 4B, the electrostatic capacitance component Cx corresponds to an imaginary number component Img; and the resistance value component Rx, to a real number component Re. The impedance Zx corresponds to the main impedance Zmg and the sub impedance Zsg (inter-electrode impedance Zms). The electrostatic capacitance component Cx corresponds to electrostatic capacitance components Cmg, Csg, Cms and the like to be described later; and the resistance value component Rx, to resistance value components Rmg, Rsg, Rms and the like to be described later. Hereinbelow, elements related to the main impedance Zmg have a suffix "mg"; elements related to the sub impedance Zsg, a suffix "sg"; and elements related to the inter-electrode impedance, a suffix "ms".

In the occupant detection apparatus having the above configuration, an example of processing for discrimination of an occupant on the seat 20 will be described with reference to FIGS. 5, 6, 7A and 7B, 8A and 8B, and 9A and 9B. FIG. 5 is a flowchart showing an example of the procedure of the occupant discrimination processing. In FIGS. 5, S10 and S12 correspond to the connection selection device or means 41; S11 and S13, to the impedance measurement device or means 42 and an impedance measurement step; and S14 to S17, to the occupant discrimination device or means 43 and an occupant discrimination step. FIG. 6 is a table showing a list of examples of connection selection to obtain the electrostatic capacitance component and the resistance value component. FIGS. 7A and 7B, 8A and 8B, and 9A and 9B are graphs showing characteristics in the respective connection examples.

The occupant discrimination processing shown in FIG. 5 is repeatedly performed during the operation of the ECU 40. First, a connection to pass the alternating current signal Sb through the main electrode 12 is selected (S10). Then the alternating current signal Sb is outputted so as to measure the main impedance Zmg (S11). Similarly, a connection to pass the alternating current signal Sb through the sub electrode 11 is selected (S12). Then the alternating current signal Sb is outputted so as to measure the sub impedance Zsg (including the inter-electrode impedance Zms) (S13). The order of two sets of (i) S10 and S11 and (ii) S12 and S13 may be performed at random. Then, based on the main impedance Zmg measured at S11 and the sub impedance Zsg (or the inter-electrode impedance Zms) measured at S13, the electrostatic capacitance component Cx and the resistance value component Rx are calculated (S14).

The connection selection at S10 and S12 depends on the electrostatic capacitance component Cx and the resistance value component Rx necessary at S14. Then, connection examples will be described with reference to FIG. 6. FIG. 6 shows selection examples J0 to J11 in accordance with the electrostatic capacitance component Cx and the resistance value component Rx. In the table, the connection example in FIG. 3A is simply indicated as "(A)", and the connection example in FIG. 3B, as "(B)". Further, in the table, "(A), (B)" means selection of the connection example in FIG. 3A and the connection example in FIG. 3B. Hereinbelow, the selection examples J3, J5 and J7 will be simply described as representative examples. Note that in the selection example J11, since only the inter-electrode impedance Zms is measured, execution of S10 and S11 is not necessary.

In the selection example J3, to obtain the electrostatic capacitance component Cmg and the resistance value component Rms, the connection in FIG. 3A and the connection in FIG. 3C are selected and the impedance Zx is measured. That is, the connection in FIG. 3A is selected, and the main impedance Zmg is measured. Then the electrostatic capacitance component Cmg is calculated based on the main impedance Zmg. Further, the connection in FIG. 3C is selected, and the inter-electrode impedance Zms is measured. Then the resistance value component Rms is calculated based on the inter-electrode impedance Zms.

In the selection example J5, to obtain the electrostatic capacitance component (Cmg+Csg) and the resistance value component Rsg, the connection in FIG. 3A and the connection in FIG. 3B are selected, and the impedance Zx is measured. That is, the connection in FIG. 3A is selected, and the main impedance Zmg is measured. Then the electrostatic capacitance component Cmg is calculated based on the main impedance Zmg. Further, the connection in FIG. 3B is selected, and the sub impedance Zsg is measured. Then the electrostatic capacitance component Csg and the resistance value component Rsg are calculated based on the sub impedance Zsg. These electrostatic capacitance component Cmg and electrostatic capacitance component Csg are added, so as to obtain the electrostatic capacitance component (Cmg+Csg).

In the selection example J7, to obtain the electrostatic capacitance component (Cmg+Csg) and the resistance value component Rms, the connection in FIG. 3A, the connection in FIG. 3B and the connection in FIG. 3C are selected, and the impedance Zx is measured. That is, the connection in FIG. 3A is selected, and the main impedance Zmg is measured. Then the electrostatic capacitance component Cmg is calculated based on the main impedance Zmg. Further, the connection in FIG. 3B is selected, and the sub impedance Zsg is measured. Then the electrostatic capacitance component Csg is calculated based on the sub impedance Zsg. These electrostatic capacitance component Cmg and electrostatic capacitance component Csg are added, so as to obtain the electrostatic capacitance component (Cmg+Csg). Further, the connection in FIG. 3C is selected, and the inter-electrode impedance Zms is measured. Then the resistance value component Rms is calculated based on the inter-electrode impedance Zms.

Returning to FIG. 5, based on the electrostatic capacitance component Cx and the resistance value component Rx calculated at S14, an occupant discrimination map is referred to and an occupant seated state is discriminated (S15). The map is previously recorded on a recording medium (e.g. a ROM, an EEPROM, a flash memory or the like) inside/outside the ECU 40. The discrimination method using the map will be described later (see FIGS. 7A and 7B, 8A and 8B, and 9A and 9B). When it is discriminated that an adult (i.e., an occupant state except the vacant seat state and the CRS attached state) is seated (YES at S16), a seated state signal is outputted as the discrimination result signal Se (S17), and the occupant discrimination processing returns. On the other hand, when it is discriminated that the occupant seated state is the vacant seat state or the CRS attached state (NO at S16), a vacant seat signal is outputted as the discrimination result signal Se (S18), and the occupant discrimination processing returns. It may be arranged such that one of S17 and S18 is performed or the both steps are performed.

Figure 8A:
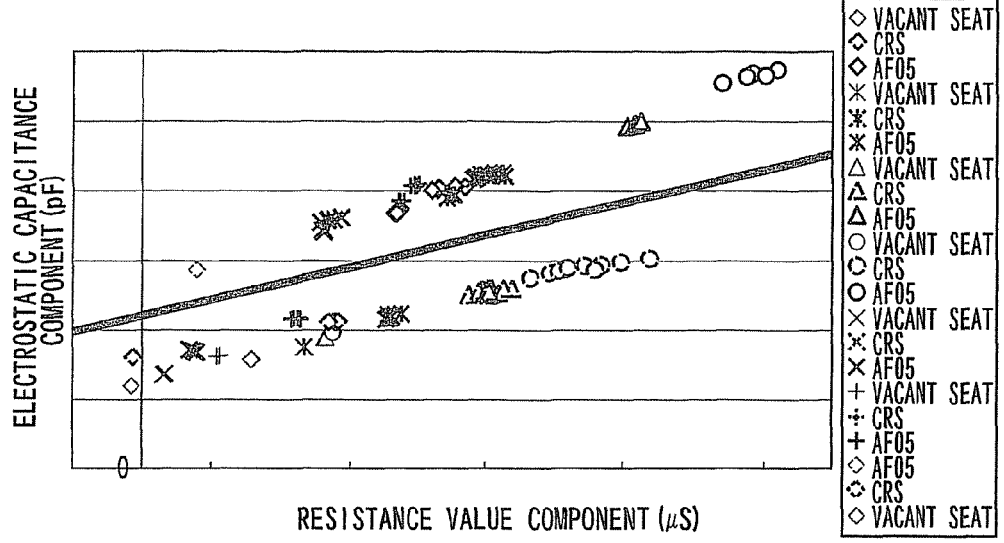
FIGS. 8A and 8B are graphs showing characteristics in a second connection example.
Figure 8B:
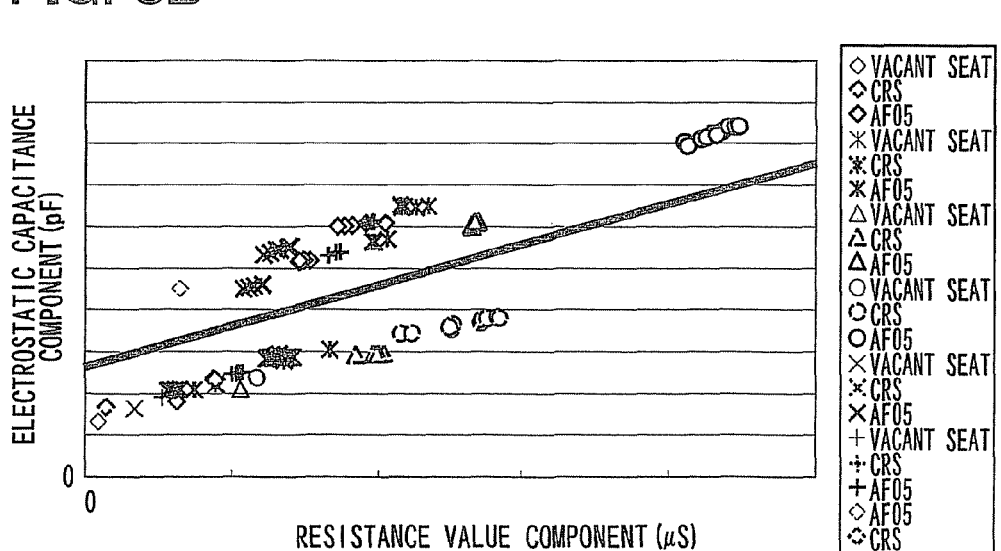
Figure 9A:
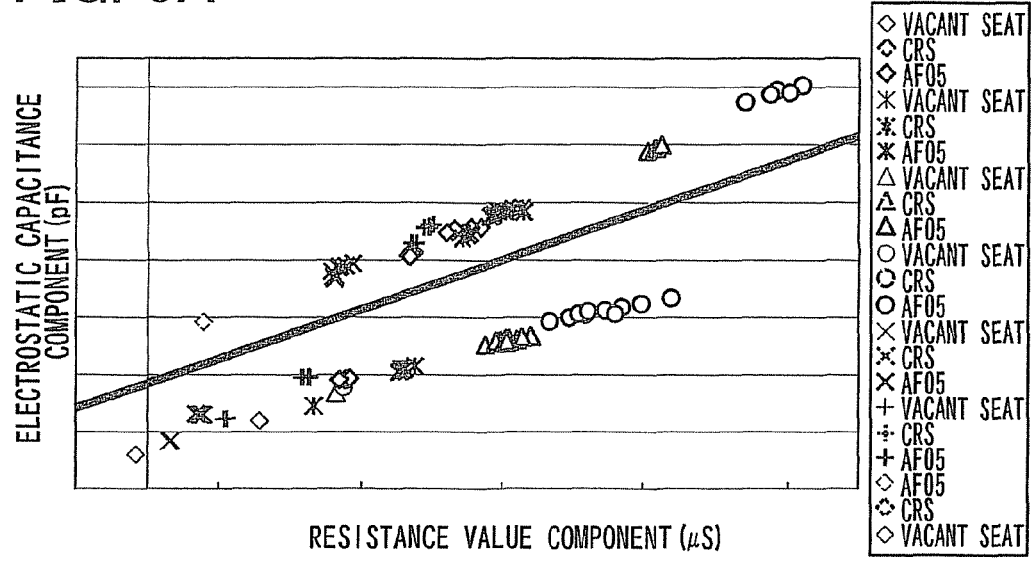
FIGS. 9A and 9B are graphs showing characteristics in a third connection example.
Figure 9B:
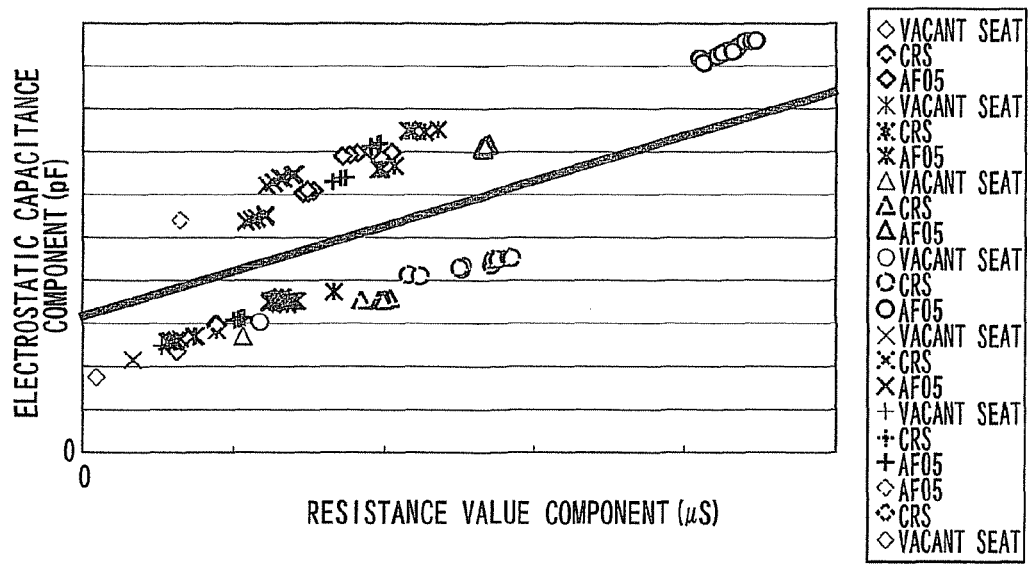

The discrimination method using the map will be described with reference to FIGS. 7A and 7B, 8A and 8B, and 9A and 9B. FIGS. 7A and 7B show an example of the map corresponding to a first connection example (selection example J3). FIGS. 8A and 8B show an example of the map corresponding to a second connection example (selection example J5). FIGS. 9A and 9B show an example of the map corresponding to a third connection example (selection example J7). FIGS. 7A, 8A and 9A show characteristics when the seat 20 is provided with a heater. FIGS. 7B, 8B and 9B show characteristics when the seat 20 is not provided with a heater. In FIGS. 7A and 7B, 8A and 8B, and 9A and 9B, same symbols and line types are used. Symbols "◊", "○", "*", "Δ", "x" and the like are used in accordance with combination of temperature and humidity in an environment where the seat 20 is set (e.g. a vehicle). As the line type of each symbol, the vacant seat state is indicated with a thin solid line; the adult seated state (AF05), a thick solid line; and the CRS attached state, a thick broken line.

In the map shown in FIGS. 7A and 7B, 8A and 8B, and 9A and 9B, the vertical axis indicates the electrostatic capacitance component, and the horizontal axis, the resistance value component (admittance component). Further, a threshold value line (a thick line in the figures) for discrimination as to whether or not an adult (i.e. an occupant state except the vacant seat state and the CRS attached state) is seated, is shown in the map. In addition to the threshold value line, results of measurement at various values of temperature and humidity are plotted with the above-described symbols. The electrostatic capacitance component and the resistance value component in respective FIGS. 7A and 7B, 8A and 8B, and 9A and 9B follow the table shown in FIG. 6. For example, the electrostatic capacitance component in FIGS. 7A and 7B corresponds to the electrostatic capacitance component Cmg, and the resistance value component corresponds to the resistance value component Rms.

As the tendency of the entire map, both the electrostatic capacitance component and the resistance value component are increased in accordance with increase in temperature. Similarly, both the electrostatic capacitance component and the resistance value component are increased in accordance with increase in humidity. The maps shown in FIGS. 7A and 7B, 8A and 8B, and 9A and 9B are recorded on the recording medium, and the occupant discrimination can be performed in correspondence with the respective connections in the selection examples J3, J5 and J7.

Figure 10:
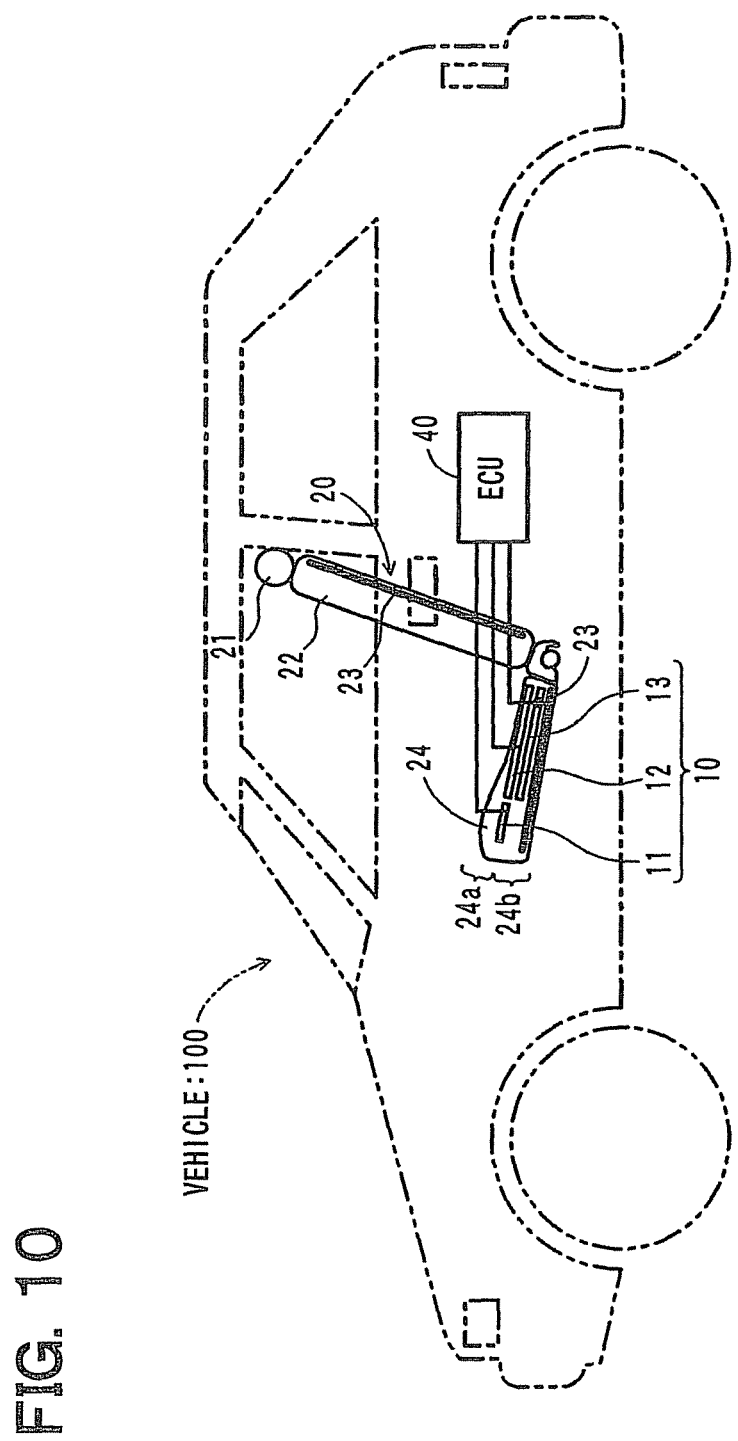
FIG. 10 is a schematic diagram showing an example of the structure of a vehicle having the occupant detection apparatus.

FIG. 10 shows a vehicle 100 (automobile), indicated with an alternate long and two short dashes line, provided with the occupant detection apparatus (i.e., the electrostatic capacitance type sensor 10 and the impedance measurement device 42) and the seat 20 configured as above.

According to the above-described embodiment, the following respective advantages can be obtained. First, as a first aspect, the guard electrode 13 is provided between the main electrode 12 and the seat frame 23, oppositely to the main electrode 12 but not oppositely to the sub electrode 11 (see FIG. 2A). Further, the impedance measurement device 42 outputs the alternating current signal Sb to pass the signal through the main electrode 12, and measures the main impedance Zmg. Further, the impedance measurement device 42 outputs the alternating current signal Sb to pass the signal through the sub electrode 11, and measures the sub impedance Zsg. The occupant discrimination device 43 is provided to discriminate an occupant based on the electrostatic capacitance component Cx of the main impedance Zmg and the resistance value component Rx of the sub impedance Zsg measured by the impedance measurement device 42 (see FIG. 1). According to this structure, as the main impedance Zmg is obtained by passing the alternating current signal Sb through the main electrode 12, wet state and high humidity state mainly in the seating face portion 24a can be detected. As the sub impedance Zsg is obtained by passing alternating current signal Sb through the sub electrode 11, wet state and high humidity state mainly in the non-seating face portion 24b can be detected. Even when the non-seating face portion 24b of the seat 20 in addition to the seating face portion 24a is in the wet state or high humidity state, it is possible to improve the accuracy of occupant discrimination by combining the electrostatic capacitance component Cx of the main impedance Zmg and the resistance value component Rx of the sub impedance Zsg.

As a second aspect, the impedance measurement device 42 passes the alternating current signal Sb at least between the main electrode 12 and the seat frame 23 so as to measure the main impedance Zmg (see FIGS. 3A and 3B and the selection examples J1 to J7 in FIG. 6). According to this structure, as the main impedance Zmg is obtained by passing the alternating current signal Sb between the main electrode 12 and the seat frame 23 (ground), the wet state, the high humidity state and the like mainly in the seating face portion 24a can be detected with high accuracy.

As a third aspect, the impedance measurement device 42 passes the alternating current signal Sb between the main electrode 12 and the seat frame 23 so as to measure the main impedance Zmg. Further, the impedance measurement device 42 passes the alternating current signal Sb between the sub electrode 11 and seat frame 23 so as to measure the sub impedance Zsg (see FIGS. 3A and 3B and the selection example J5 in FIG. 6). According to this structure, as the main impedance Zmg is obtained by passing the alternating current signal Sb between the main electrode 12 and the seat frame 23 (ground), the wet state, the high humidity state and the like mainly in the seating face portion 24a can be detected with high accuracy. Further, as the sub impedance Zsg is obtained by passing the alternating current signal Sb between the sub electrode 11 and the seat frame 23, the wet state, the high humidity state and the like mainly in the non-seating face portion 24b can be detected with high accuracy.

As a fourth aspect, the impedance measurement device 42 passes the alternating current signal Sb between the main electrode 12 and the seat frame 23 so as to measure the main impedance Zmg. Further, the impedance measurement device 42 passes the alternating current signal Sb between the main electrode 12 and the sub electrode 11 so as to measure the sub impedance Zsg (see FIGS. 3A and 3C and the selection example J7 in FIG. 6). According to this structure, as the main impedance Zmg is obtained by passing the alternating current signal Sb between the main electrode 12 and the seat frame 23 (ground), the wet state, the high humidity state and the like mainly in the seating face portion 24a can be detected with high accuracy. Further, as the sub impedance Zsg is obtained by passing the alternating current signal Sb between the main electrode 12 and the sub electrode 11, the wet state, the high humidity state and the like mainly in the vicinity of the non-seating face portion 24b can also be detected with high accuracy.

As a fifth aspect, the impedance measurement device 42 passes the alternating current signal Sb at least between the main electrode 12 and the sub electrode 11 so as to measure the sub impedance Zsg (see FIGS. 3A and 3B and the selection examples J8 to J11 in FIG. 6). According to this structure, as the sub impedance Zsg is obtained by passing the alternating current signal Sb between the main electrode 12 and the sub electrode 11, the wet state, the high humidity state and the like mainly in the vicinity of the seating face portion 24a can be detected with high accuracy.

As a sixth aspect, the impedance measurement device 42 passes the alternating current signal Sb between the main electrode 12 and the seat frame 23 so as to measure the main impedance Zmg. Further, the impedance measurement device 42 passes alternating current signal Sb between the main electrode 12 and the sub electrode 11 so as to measure the sub impedance Zsg (see FIGS. 3A and 3B and the selection example J3 in FIG. 6). According to this structure, as the sub impedance Zsg is obtained by passing the alternating current signal Sb between the sub electrode 11 and the seat frame 23 (ground), the wet state, the high humidity state and the like mainly in the non-seating face portion 24b can be detected with high accuracy.

As a seventh aspect, the impedance measurement device 42 has a connection selection device 41 to select a connection between the main electrode 12 and the seat frame 23, between the sub electrode 11 and the seat frame 23, or between the main electrode 12 and the sub electrode 11 upon measurement of the main impedance Zmg and the sub impedance Zsg by passing the alternating current signal Sb (see FIGS. 3A and 3B). According to this structure, it is possible to measure a target impedance while simply selecting one of the plural connections.

As an eighth aspect, the guard electrode 13 is provided between the main electrode 12 and the seat frame 23, oppositely to the main electrode 12 but not oppositely to the sub electrode 11 (see FIG. 2A). Further, in the structure, executed is an impedance measurement step of measuring the main impedance Zmg by outputting the alternating current signal Sb to pass the signal through the main electrode 12 and measuring the sub impedance Zsg by outputting the alternating current signal Sb to pass the signal through the sub electrode 11 by the impedance measurement device 42; and an occupant discrimination step of discriminating an occupant based on the electrostatic capacitance component Cx of the main impedance Zmg and the resistance value component Rx of the sub impedance Zsg measured by the impedance measurement device 42 (see FIG. 5). According to this structure, at the occupant discrimination step, the occupant is discriminated based on the electrostatic capacitance component Cx of the main impedance Zmg and the resistance value component Rx of the sub impedance Zsg. Accordingly, it is possible to improve the accuracy of occupant discrimination even when the non-seating face portion 24b of the seat 20 in addition to the seating face portion 24a is in wet state or high humidity state.

As a ninth aspect, the vehicle 100 has the occupant detection apparatus (i.e., the electrostatic capacitance type sensor 10 and the impedance measurement device 42) and the seat 20 (see FIG. 10). According to this structure, it is possible to provide a vehicle in which the accuracy of occupant discrimination can be improved even when the non-seating face portion 24b of the seat 20 in addition to the seating face portion 24a is in a wet or high humidity state.

OTHER EMBODIMENTS

The embodiment to implement the present invention has been described as above, however, the present invention is not limited to the above embodiment. In other words, various embodiments can be made within a scope not departing from the subject matter of the present invention. For example, the following respective embodiments may be realized.

Figure 11A:
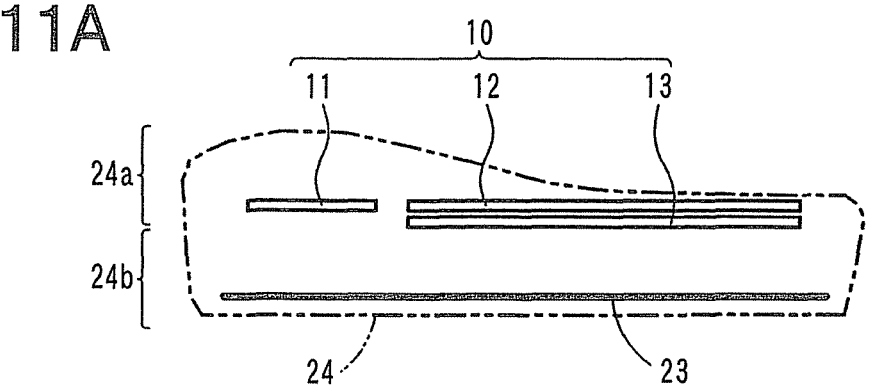
FIGS. 11A to 11C schematically illustrate other examples of the configuration of the electrostatic capacitance type sensor.
Figure 11B:
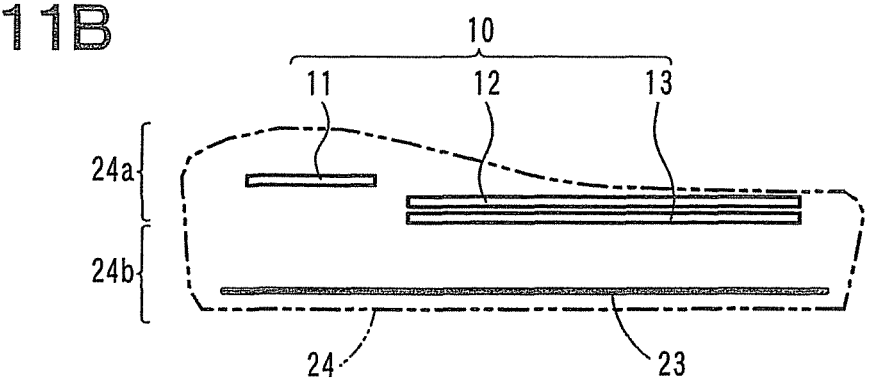
Figure 11C:
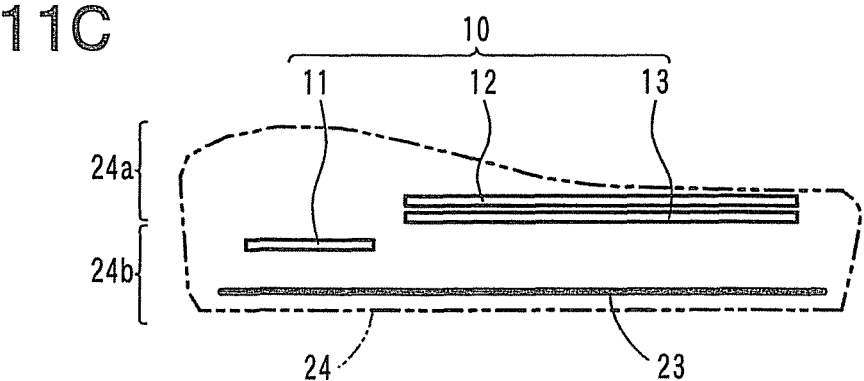

In the above-described embodiment, the sub electrode 11 is provided away from the main electrode 12 in a planar direction as shown in FIG. 11A. That is, the sub electrode 11 and the main electrode 12 are provided on approximately the same plane. This embodiment may be replaced with an arrangement where the sub electrode 11 and the main electrode 12 are not provided on approximately the same plane. For example, the arrangement shown in FIG. 11B where the sub electrode 11 is closer to the seating face portion 24a, or the arrangement shown in FIG. 11C where the sub electrode is closed to the seat frame 23 may be used. As the electrostatic capacitance component and the resistance value component are increased in accordance with the amount of water between the electrode and the seat frame 23 as the ground, the arrangement shown in FIG. 11B is the highest, and the arrangement shown in FIG. 11C is the lowest. It is possible to improve the accuracy of precise occupant discrimination in accordance with district or the like by changing the arrangement in correspondence with e.g. the difference between a cold region and a warm-temperature region.

In the above-described embodiment, the map corresponding to water (including humidity) is recorded on the recording medium (see FIGS. 7A and 7B, 8A and 8B, and 9A and 9B). In addition to this embodiment, it may be arranged such that a map corresponding to an electrolytic solution having conductivity (e.g. a juice or salt water) is recorded on the recording medium. The map corresponding to the electrolytic solution may be recorded integrally with the map corresponding to water (i.e., in one map), or may be recorded separately from the map corresponding to water. When the seat 20 is wet with the electrolytic solution, greater values are obtained in comparison with the electrostatic capacitance component and the resistance value component shown in FIGS. 7A and 7B, 8A and 8B, and 9A and 9B. Even when one or both the seating face portion 24a and the non-seating face portion 24b is in the wet state with the electrolytic solution or the high humidity state, it is possible to improve the accuracy of occupant discrimination by combining the electrostatic capacitance component Cx of the main impedance Zmg and the resistance value component Rx of the sub impedance Zsg.

In the above-described embodiment, as the external apparatus 50, an airbag ECU is applied (see FIG. 1). In place of this embodiment (or in addition to this embodiment), it may be arranged such that other processor than the airbag ECU (e.g., an engine ECU), other processor than the ECU, a computer connectable via a communication line (including a server and a personal computer), or the like is applied. When the engine ECU is applied, it is possible to prevent starting of the vehicle 100 when an adult is not seated. When another processor or computer is applied, the result of occupant discrimination can be infallibly transmitted.

In the above-described embodiment, the seat frame 23 is applied as the ground (GND) indicating electrical isopotential (see FIG. 1). In place of this embodiment (or in addition to this embodiment), a conductive member (e.g. a wire, a wire gauze, a conductive line or the like) may be applied. As merely the member to indicate a reference potential for measurement of the impedance (i.e. the main impedance Zmg, the sub impedance Zsg and the like) is different, the same advantages as those in the above-described embodiment can be obtained.

In the above-described embodiment, as an object provided with the occupant detection apparatus (i.e., the electrostatic capacitance type sensor 10 and the impedance measurement device 42), the vehicle 100 is applied (see FIG. 11). In place of this embodiment, the present invention is similarly applicable to other transport equipment than the vehicle 100. The other transport equipment capable of transportation of passengers and goods is e.g. an aircraft or a ship. The difference between the vehicle and such transport equipment is merely a structural difference. As such other transport equipment is capable of transportation of passengers and goods, the same advantages as those in the above-described embodiment can be obtained.

While examples of the disclosure described herein are already recited in the preceding summary, further optional examples thereto may be set out as follows.

For instance, as an optional example of the disclosure, the impedance measurement device may pass the alternating current signal at least between the main electrode and the seat frame so as to measure the main impedance. According to the above structure, as the main impedance can be obtained by passing the alternating current signal between the main electrode and the seat frame (ground), the wet state, the high humidity state and the like mainly in the seating face portion can be detected with high accuracy.

Further, as an optional example of the disclosure, the impedance measurement device may pass the alternating current signal between the main electrode and the seat frame so as to measure the main impedance, and passes the alternating current signal between the sub electrode and the seat frame so as to measure the sub impedance. According to the above structure, as the main impedance can be obtained by passing the alternating signal between the main electrode and the seat frame (ground), the wet state, the high humidity state and the like mainly in the seating face portion can be detected with high accuracy. Further, as the sub impedance can be obtained by passing the alternating current signal between the sub electrode and the seat frame, the wet state, the high humidity state and the like mainly in the non-seating face portion can be detected with high accuracy.

Further, as an optional example of the disclosure, the impedance measurement device may pass the alternating current signal between the main electrode and the seat frame so as to measure the main impedance, and passes the alternating current signal between the main electrode and the sub electrode so as to measure the sub impedance. According to the above structure, as the main impedance can be obtained by passing the alternating current signal between the main electrode and the seat frame (ground), the wet state, the high humidity state and the like mainly in the seating face portion can be detected with high accuracy. Further, as the sub impedance can be obtained by passing the alternating signal between the main electrode and the sub electrode, the wet state, the high humidity state and the like mainly in the vicinity of the seating face portion can be detected with high accuracy.

Further, as an optional example of the disclosure, the impedance measurement device may pass the alternating current signal between at least the main electrode and the sub electrode so as to measure the sub impedance. According to the above structure, as the sub impedance can be obtained by passing the alternating signal between the main electrode and the sub electrode, the wet state, the high humidity state and the like mainly in the vicinity of the seating face portion can be detected with high accuracy.

Further, as an optional example of the disclosure, the impedance measurement device may pass the alternating current signal between the main electrode and the seat frame so as to measure the main impedance, and passes the alternating current signal between the main electrode and the sub electrode so as to measure the sub impedance. According to the above structure, as the sub impedance can be obtained by passing the alternating current signal between the sub electrode and the seat frame (ground), the wet state, the high humidity state and the like mainly in the non-seating face portion can be detected with high accuracy.

Further, as an optional example of the disclosure, the impedance measurement device may have a connection selection device that, upon passing the alternating current signal to measure the main impedance and the sub impedance, selects a connection between the main electrode and the seat frame, between the sub electrode and the seat frame, or between the main electrode and the sub electrode. According to the above structure, as the connection selection device selects any one connection, it is possible to measure the target impedance while simply selecting one of the plural connections. The connection selection is performed between arbitrarily selected two points. For example, the connection selection is performed from the connection between the main electrode and the seat frame and between the sub electrode and the seat frame, and the connection between the main electrode and the seat frame and between the main electrode and the sub electrode.

What is claimed:

1. An occupant detection apparatus comprising:
   an electrostatic capacitance type sensor including
   (i) a main electrode provided in a seating face portion of a seat,
   (ii) a sub electrode provided away from the main electrode in a planar direction, and
   (iii) a guard electrode provided between the seating face portion and a seat frame, wherein the guard electrode is provided between the main electrode and the seat frame, opposite to the main electrode and not opposite to the sub electrode;
   an impedance measurement device that outputs an alternating current signal to the electrostatic capacitance type sensor so as to measure an impedance of the electrostatic capacitance type sensor,
   the impedance measurement device outputting the alternating current signal to pass the alternating current signal through the main electrode so as to measure a main impedance, the impedance measurement device outputting the alternating current signal to pass the alternating current signal through the sub electrode so as to measure a sub impedance;
an occupant discrimination device that discriminates an occupant based on an electrostatic capacitance component of the main impedance and a resistance value component of the sub impedance measured by the impedance measurement device;
a recording medium that stores a previously prepared map having two orthogonal axes respectively indicating the electrostatic capacitance component and the resistance value component so as to discriminate the occupant, the map being previously prepared by measuring electrostatic capacitance components and resistance value components under conditions where an occupant subject is seated under a plurality of combinations of temperature and humidity in environment in which the seat is set,
wherein the occupant discrimination device uses the map stored in the storage medium to discriminate the occupant based on the electrostatic capacitance component of the main impedance and the resistance value component of the sub impedance measured by the impedance measurement device.

2. The occupant detection apparatus according to claim 1, wherein the impedance measurement device passes the alternating current signal at least between the main electrode and the seat frame so as to measure the main impedance.

3. The occupant detection apparatus according to claim 1, wherein the impedance measurement device passes the alternating current signal between the main electrode and the seat frame so as to measure the main impedance, and passes the alternating current signal between the sub electrode and the seat frame so as to measure the sub impedance.

4. The occupant detection apparatus according to claim 1, wherein the impedance measurement device passes the alternating current signal between the main electrode and the seat frame so as to measure the main impedance, and passes the alternating current signal between the main electrode and the sub electrode so as to measure the sub impedance.

5. The occupant detection apparatus according to claim 1, wherein the impedance measurement device passes the alternating current signal between at least the main electrode and the sub electrode so as to measure the sub impedance.

6. The occupant detection apparatus according to claim 1, wherein the impedance measurement device passes the alternating current signal between the main electrode and the seat frame so as to measure the main impedance, and passes the alternating current signal between the main electrode and the sub electrode so as to measure the sub impedance.

7. The occupant detection apparatus according to claim 1, wherein the impedance measurement device has a connection selection device that, upon passing the alternating current signal to measure the main impedance and the sub impedance, selects a connection between the main electrode and the seat frame, between the sub electrode and the seat frame, or between the main electrode and the sub electrode.

8. A vehicle having the occupant detection apparatus and the seat according to claim 1.

9. The occupant detection apparatus according to claim 1, wherein a planar face of the sub electrode directly faces the seat frame without the guard electrode being disposed directly between the planar face of the sub electrode and the seat frame.

10. An occupant discrimination method for discriminating an occupant using an occupant detection apparatus including:
an electrostatic capacitance type sensor containing a main electrode provided in a seating face portion of a seat, a sub electrode provided away from the main electrode in a planar direction, and a guard electrode provided between the seating face portion and a seat frame, wherein the guard electrode is provided between the main electrode and the seat frame opposite to the main electrode and not opposite to the sub electrode; and
an impedance measurement device that outputs an alternating current signal to the electrostatic capacitance type sensor to measure an impedance of the electrostatic capacitance type sensor,
the method comprising:
an impedance measurement step of outputting the alternating current signal to pass the alternating current signal through the main electrode so as to measure a main impedance, and outputting the alternating current signal to pass the alternating current signal through the sub electrode so as to measure a sub impedance, by the impedance measurement device; and
an occupant discrimination step of discriminating an occupant based on an electrostatic capacitance component of the main impedance and a resistance value component of the sub impedance measured by the impedance measurement device; wherein
the occupant detection apparatus further includes a recording medium that stores a previously prepared map having two orthogonal axes respectively indicating the electrostatic capacitance component and the resistance value component so as to discriminate the occupant, the map being previously prepared by measuring electrostatic capacitance components and resistance value components under conditions where an occupant subject is seated under a plurality of combinations of temperature and humidity in environment in which the seat is set; and
the occupant discrimination step uses the map stored in the storage medium to discriminate the occupant based on the electrostatic capacitance component of the main impedance and the resistance value component of the sub impedance measured in the impedance measurement step.

11. The occupant detection apparatus according to claim 10,
wherein a planar face of the sub electrode directly faces the seat frame without the guard electrode being disposed directly between the planar face of the sub electrode and the seat frame.

12. An occupant detection apparatus comprising:
an electrostatic capacitance type sensor including
(i) a main electrode provided in a seating face portion of a seat,
(ii) a sub electrode provided away from the main electrode in a planar direction, and
(iii) a guard electrode provided between the seating face portion and a seat frame, wherein the guard electrode is provided between the main electrode and the seat frame, opposite to the main electrode and not opposite to the sub electrode;

an impedance measurement device that outputs an alternating current signal to the electrostatic capacitance type sensor so as to measure an impedance of the electrostatic capacitance type sensor,
the impedance measurement device outputting the alternating current signal to pass the alternating current signal through the main electrode so as to measure a main impedance,
the impedance measurement device outputting the alternating current signal to pass the alternating current signal through the sub electrode so as to measure a sub impedance; and
an occupant discrimination device that discriminates an occupant based on an electrostatic capacitance component of the main impedance and/or the sub impedance and a resistance value component of the main impedance and/or the sub impedance; wherein
a recording medium that stores a previously prepared map having two orthogonal axes respectively indicating the electrostatic capacitance component and the resistance value component so as to discriminate the occupant, the map being previously prepared by measuring electrostatic capacitance components and resistance value components under conditions where an occupant subject is seated under a plurality of combinations of temperature and humidity in environment in which the seat is set,
wherein the occupant discrimination device uses the map stored in the storage medium to discriminate the occupant based on the electrostatic capacitance component of the main impedance and/or the sub impedance and the resistance value component of the main impedance and/or the sub impedance measured by the impedance measurement device.

13. The occupant detection apparatus according to claim 12,
wherein a planar face of the sub electrode directly faces the seat frame without the guard electrode being disposed directly between the planar face of the sub electrode and the seat frame.

14. An occupant detection apparatus comprising:
an electrostatic capacitance type sensor including
(i) a main electrode provided in a seating face portion of a seat,
(ii) a sub electrode provided away from the main electrode in a planar direction, and
(iii) a guard electrode provided between the seating face portion and a seat frame, wherein the guard electrode is provided between the main electrode and the seat frame, opposite to the main electrode and not opposite to the sub electrode;
an impedance measurement device that outputs an alternating current signal to the electrostatic capacitance type sensor so as to measure an impedance of the electrostatic capacitance type sensor,
the impedance measurement device outputting the alternating current signal to passes the alternating current signal between at least the main electrode and the sub electrode so as to measure the sub impedance; and
an occupant discrimination device that discriminates an occupant based on an electrostatic capacitance component of the sub impedance and a resistance value component of the sub impedance;
a recording medium that stores a previously prepared map having two orthogonal axes respectively indicating the electrostatic capacitance component and the resistance value component so as to discriminate the occupant, the map being previously prepared by measuring electrostatic capacitance components and resistance value components under conditions where an occupant subject is seated under a plurality of combinations of temperature and humidity in environment in which the seat is set,
wherein the occupant discrimination device uses the map stored in the storage medium to discriminate the occupant based on the electrostatic capacitance component of the sub impedance and the resistance value component of the sub impedance measured by the impedance measurement device.

15. The occupant detection apparatus according to claim 14,
wherein a planar face of the sub electrode directly faces the seat frame without the guard electrode being disposed directly between the planar face of the sub electrode and the seat frame.

16. An occupant detection apparatus comprising:
an electrostatic capacitance type sensor including
(i) a main electrode provided in a seating face portion of a seat, and
(ii) a guard electrode provided between the seating face portion and a seat frame, wherein the guard electrode is provided between the main electrode and the seat frame, opposite to the main electrode;
an impedance measurement device that outputs an alternating current signal to the electrostatic capacitance type sensor so as to measure an impedance of the electrostatic capacitance type sensor,
the impedance measurement device outputting the alternating current signal to pass the alternating current signal through the main electrode so as to measure a main impedance; and
an occupant discrimination device that discriminates an occupant based on an electrostatic capacitance component of the main impedance and a resistance value component of the main impedance;
a recording medium that stores a previously prepared map having two orthogonal axes respectively indicating the electrostatic capacitance component and the resistance value component so as to discriminate the occupant, the map being previously prepared by measuring electrostatic capacitance components and resistance value components under conditions where an occupant subject is seated under a plurality of combinations of temperature and humidity in environment in which the seat is set,
wherein the occupant discrimination device uses the map stored in the storage medium to discriminate the occupant based on the electrostatic capacitance component of the main impedance and the resistance value component of the main impedance measured by the impedance measurement device.

17. The occupant detection apparatus according to claim 16,
wherein the guard electrode is provided between the main electrode and the seat electrode only at a position directly opposite to the main electrode.

* * * * *